US012115645B2

(12) United States Patent
Greenblatt et al.

(10) Patent No.: US 12,115,645 B2
(45) Date of Patent: Oct. 15, 2024

(54) BICYCLE REPAIR STAND

(71) Applicant: Everlast Climbing Industries, Inc., Crystal, MN (US)

(72) Inventors: Joel Greenblatt, Golden Valley, MN (US); Sarah Mae Howard, Lakeville, MN (US); Timothy Shaun Sudeith, Edina, MN (US); Colin Klotzbach, West St. Paul, MN (US)

(73) Assignee: EVERLAST CLIMBING INDUSTRIES, INC., North Crystal, MN (US)

( * ) Notice: Subject to any disclaimer, the term of this patent is extended or adjusted under 35 U.S.C. 154(b) by 0 days.

(21) Appl. No.: 17/987,398

(22) Filed: Nov. 15, 2022

(65) Prior Publication Data

US 2024/0157540 A1 May 16, 2024

(51) Int. Cl.
*B25H 1/00* (2006.01)
*B25H 1/12* (2006.01)

(52) U.S. Cl.
CPC ............. *B25H 1/0014* (2013.01); *B25H 1/12* (2013.01)

(58) Field of Classification Search
CPC ...... B25H 1/0014; B25H 1/12; B25H 1/0021; B25H 1/0042; B25H 5/00; B62H 3/02; B62H 3/00; B62H 3/12
USPC ........ 211/22, 70.6, 17, 18, 196, 205; 29/650
See application file for complete search history.

(56) References Cited

U.S. PATENT DOCUMENTS 542,964 A * 7/1895 Le Fevre ................. B62H 3/00 211/22
559,312 A * 4/1896 Seely ....................... B62H 3/10 248/176.1
594,748 A * 11/1897 Le Fevre ................. B62H 3/00 211/173
598,040 A 1/1898 Webster
619,186 A * 2/1899 Kingsbury ............... B62H 3/00 211/22
653,519 A * 7/1900 Masters ................... B62H 3/00 211/163
2,462,980 A 3/1949 Litt
2,944,811 A * 7/1960 Wolf .................... B25H 1/0014 269/297
3,675,784 A 7/1972 John
3,981,491 A * 9/1976 Snyder ................. B25H 1/0007 211/22

(Continued)

OTHER PUBLICATIONS

Derovations Corporation, "Dero Fixit", www.dero.com, Feb. 23, 2012, pdf file.

(Continued)

*Primary Examiner* — Jennifer E. Novosad
(74) *Attorney, Agent, or Firm* — McAndrews, Held & Malloy, Ltd.

(57) ABSTRACT

A bicycle repair stand having a main body extending vertically from a base that is mounted to a ground surface and which includes first and second bicycle hangers extending from the main body in opposing directions. An access opening extends through the main body and cables suspend a set of bicycle tools within the access opening, such that each bicycle tool is accessible in opposing directions for use on a bicycle held by either one of the first or second bicycle hanger. The first and second bicycle hangers may also be positioned at different heights to avoid interference between two bicycles during use.

20 Claims, 13 Drawing Sheets

(56) References Cited

U.S. PATENT DOCUMENTS

| | | | | | |
|---|---|---|---|---|---|
| 4,145,006 | A * | 3/1979 | Webb | B23Q 1/48 | 269/69 |
| D281,199 | S | 10/1985 | Prawl | | |
| D283,414 | S | 4/1986 | Shedden | | |
| D288,995 | S | 3/1987 | Cooper | | |
| 5,129,559 | A * | 7/1992 | Holliday | B60R 9/10 | 224/485 |
| 5,141,211 | A * | 8/1992 | Adams, Jr. | B25H 3/06 | 269/69 |
| 5,190,195 | A * | 3/1993 | Fullhart | B60R 9/10 | 224/532 |
| 5,222,707 | A * | 6/1993 | Myers | B62H 3/02 | 248/206.3 |
| D337,082 | S | 7/1993 | Hellesoe | | |
| D348,966 | S | 7/1994 | Guyton | | |
| 5,497,967 | A * | 3/1996 | Gantois | B25H 1/0014 | 248/166 |
| D373,519 | S | 9/1996 | Escalante et al. | | |
| D373,884 | S | 9/1996 | Price | | |
| D388,925 | S | 1/1998 | Hulegaard et al. | | |
| 5,765,821 | A * | 6/1998 | Janisse | B25H 1/0014 | 269/69 |
| 5,996,814 | A * | 12/1999 | Workman | B62H 3/00 | 211/22 |
| 6,089,428 | A * | 7/2000 | Wagner | B60R 9/10 | 224/511 |
| D445,273 | S | 7/2001 | Brown et al. | | |
| 6,305,667 | B1 | 10/2001 | Heller | | |
| 6,558,129 | B2 * | 5/2003 | Wang | F04B 33/005 | 417/63 |
| D490,289 | S | 5/2004 | Chuang | | |
| 6,926,254 | B1 | 8/2005 | Nymann | | |
| 7,311,048 | B2 | 12/2007 | Kopala, Jr. | | |
| 7,490,799 | B2 * | 2/2009 | Young | A01B 59/042 | 248/220.22 |
| D595,618 | S | 7/2009 | Dallaire | | |
| 7,575,207 | B2 | 8/2009 | Chuang | | |
| D599,714 | S | 9/2009 | Neff | | |
| 7,712,614 | B2 * | 5/2010 | Carlson | F16M 11/242 | 248/176.1 |
| D660,749 | S | 5/2012 | Strayer | | |
| D680,914 | S | 4/2013 | Greenblatt et al. | | |
| 9,004,137 | B2 * | 4/2015 | Voegeli | B25H 1/0014 | 157/14 |
| 9,095,973 | B2 * | 8/2015 | Greenblatt | B25H 5/00 | |
| 9,239,046 | B2 * | 1/2016 | Wang | F04B 33/005 | |
| 9,498,880 | B2 * | 11/2016 | Scholtz | B25H 1/0014 | |
| 9,505,124 | B2 * | 11/2016 | Greenblatt | B25H 3/04 | |
| 9,789,602 | B2 * | 10/2017 | DeBaker | F04B 33/005 | |
| 10,392,064 | B2 * | 8/2019 | Rossiter | B62H 3/12 | |
| 11,046,380 | B1 * | 6/2021 | Gu | B62H 3/12 | |
| 11,142,133 | B1 * | 10/2021 | Oshman | B60R 9/10 | |
| D953,208 | S * | 5/2022 | Goins | D12/115 | |
| 11,460,017 | B2 * | 10/2022 | Greenblatt | B62H 3/04 | |
| 2002/0117526 | A1 * | 8/2002 | Anderson | B60R 9/10 | 224/532 |
| 2006/0208240 | A1 | 9/2006 | Spittle et al. | | |
| 2007/0138111 | A1 | 6/2007 | Schairer et al. | | |
| 2007/0235400 | A1 * | 10/2007 | Wald | A63B 71/0036 | 211/85.7 |
| 2012/0007298 | A1 * | 1/2012 | Proietti | B25H 1/0014 | 269/61 |
| 2012/0298605 | A1 * | 11/2012 | Dovner | B62H 3/12 | 211/13.1 |
| 2013/0219705 | A1 | 8/2013 | Scholtz et al. | | |
| 2014/0021155 | A1 * | 1/2014 | Ferre-Rangel | B63B 32/83 | 211/182 |
| 2014/0041180 | A1 * | 2/2014 | Williams | F16M 11/20 | 248/676 |
| 2014/0083626 | A1 * | 3/2014 | Voegeli | B25H 1/0014 | 29/559 |
| 2014/0263880 | A1 * | 9/2014 | Greenblatt | B25H 3/04 | 248/121 |
| 2015/0298314 | A1 * | 10/2015 | DeBaker | B25H 5/00 | 29/559 |
| 2016/0297063 | A1 * | 10/2016 | Chuang | B25H 1/0014 | |
| 2020/0362841 | A1 * | 11/2020 | Greenblatt | F04B 33/005 | |
| 2022/0403833 | A1 * | 12/2022 | Greenblatt | F04B 39/123 | |

OTHER PUBLICATIONS

Madrax Catalog, Bike Racks, New Products, copyright 2012, Grabar Manufacturing, Inc., 44 pages.

Bike Fixtation, Public Work Stand, copyright 2013, Bik Fixtation LLC, 2 pages.

University Time, Universiy of Pittsburgh, Campus Adds Amenities for Cyclists, published May 3, 2012, 1 page.

Chester, Brett, Denver Westword Blogs, "Whole Foods Market on Capitol Hill Installs Dero Fixit Bike Stand", posted Jun. 11, 2012, 4 pages.

Streetscapes, "Bicycle Fixit Station—FT—GA", copyright 2013, Streetscapes, Inc., 1 page.

Exhibit A—Derovations Fixit, Admitted Prior Arty as of the earliest priority date for the present patent application.

* cited by examiner

BICYCLE REPAIR STAND

BACKGROUND

Due to the increasing number of cyclists in the United States, bicycle trails and urban bicycle commuting routes are heavily used. Bicycle repair stands such as the Dero Fixit®, described for instance in U.S. Pat. No. 9,498,880, are positioned along those trails and commuting routes and provide cyclists with all the tools necessary to perform basic bike repairs and maintenance, from changing a flat tire to adjusting brakes and derailleurs. The present invention improves upon the Fixit® in a number of important aspects.

SUMMARY OF THE INVENTION

Embodiments of the present disclosure are directed to a bicycle repair stand that includes a base configured to be mounted to a ground surface, a main body extending vertically from the base, and first and second bicycle hangers. The first bicycle hanger extends from a first side of the main body and is configured to hold a first bicycle in an elevated position above the ground surface, e.g. suspend the bicycle above the ground so that the pedals and wheels may spin freely while being worked on. The second bicycle hanger extends from a second side of the main body and is configured to hold a second bicycle in an elevated position above the ground surface, e.g. suspend the bicycle above the ground so that the pedals and wheels may spin freely while being worked on. The first and second sides are substantially opposite one another, such that the first bicycle hanger and the second bicycle hanger extend in substantially opposite directions.

The bicycle repair stand also includes at least one set of bicycle tools, in which each bicycle tool is coupled to a first end of a cable and a second end of the cable is coupled to the main body. In some embodiments, the bicycle repair stand comprises a single set of bicycle tools that is accessible to and configured for use on a bicycle held by either one of the first bicycle hanger or the second bicycle hanger. For instance, the main body may comprise an opening extending through the main body between the first and second sides and the set of bicycle tools may be positioned within the opening such that each bicycle tool is accessible from both the first side and the second side of the main body. In other embodiments, the bicycle repair stand may comprise two sets of bicycle tools, one accessible to and configured for use on a bicycle held by the first bicycle hanger and another accessible to and configured for use on a bicycle held by the second bicycle hanger.

In some embodiments, the first bicycle hanger and the second bicycle hanger may be vertically offset from one another in order to give a user the option to select a hanger that positions his/her bicycle at the most comfortable working height, which may depend on the height of the user, the specific repairs or adjustments being performed, etc., and/or to reduce or prevent interference between bicycles when two bicycles are being worked on at the same time. In some embodiments, for example, the second bicycle hanger may be vertically offset from the first bicycle hanger by at least three inches (i.e., three inches or more), alternatively at least four inches, alternatively at least five inches, or the like.

When a single set of bicycle tools is to be used with bicycles held by both hangers and where the hangers are offset from one another, the repair stand is configured such that each bicycle tool may be brought to both (i) locations corresponding with all portions of a bicycle held by the first bicycle hanger on which the tool may be used, and (ii) locations corresponding with all portions of a bicycle held by the second bicycle hanger on which the tool may be used. This may be achieved by cables having an extended length, which may require the central opening in which the tools are positioned to span a significant distance along the height of the main body. In some embodiments, for instance, the opening may span at least 60%, alternatively at least 65%, alternatively at least 70%, alternatively at least 75%, alternatively at least 80% of the vertical height of the main body.

Embodiments of the present disclosure are also directed to a bicycle repair stand in which the first and second bicycle hangers are attachable to the main body in a variety of configurations. In some embodiments, for instance, an installer may select from the following configurations: (a) the first bicycle hanger and the second bicycle hanger may both be positioned at a first height; (b) the first bicycle hanger and the second bicycle hanger may both be positioned at a second height; or (c) the first bicycle hanger may be positioned at the first height and the second bicycle hanger may be positioned at the second height. The first height and the second height may desirably be offset by about three inches or more, alternatively about four inches or more, alternatively about five inches or more.

In some embodiments, each bicycle hanger may comprise a first support member and a second support member, the first and second support members (and more particularly the distal ends of the first and second support members) forming a space configured to receive a seat post of a bicycle and/or an alternative portion of a bicycle frame. In order to provide a secure holding of a bicycle and/or to prevent damage to the bicycle frame, the distal ends of the first and second support members may each include an end cap formed of a material that is softer than the material from which the support members are formed. In some embodiments, for example, the end cap may be produced from a material having a desired combination of flexibility and durability, such as a thermoplastic polyurethane material.

In some embodiments, each bicycle hanger may be attached directly to a sidewall or portion of the sidewall (e.g., where circular in cross-section) of the main body of the repair stand, e.g. as opposed to a cap element as in the current Fixit® product. However, in some embodiments, and particularly those in which the tool access opening covers a significant portion of the height of the repair stand, it may be desirable that the bicycle hangers are not attached to the first and second sides of the main body through which the tool access opening extends. In some embodiments, therefore, the bicycle hangers (and more particularly the proximal ends of the bicycle hangers) may be attached to third and fourth sides of the main body, i.e. the sides of the main body that span between the first and second sides.

In some embodiments, each bicycle hanger may be attached to both the third and fourth side of the main body, e.g. the first support member of the bicycle hanger (and more particularly the proximal end of the first support member) may be attached to one of the third/fourth sides of the main body and the second support member of the bicycle hanger (and more particularly the proximal end of the second support member) may be attached to the other of the third/fourth sides of the main body. In such an embodiment, at least one (and optionally both) support member may be curved or angled inward toward the other support member so that the gap between the first and second support members at the distal end of the bicycle hanger is reduced to form the space configured to receive a seat post of a bicycle or an alternative portion of a bicycle frame.

The manner of securing the bicycle hangers to the main body may vary. In some embodiments, for instance, each of the third and fourth sides of the main body may comprise a plurality of slots, each of which is configured to receive a portion of the first or second bicycle hanger. In this manner, a portion, e.g. mounting plate, of the proximal end of a first support member of a bicycle hanger may be received by a slot on the third side of the main body and a portion, e.g. mounting plate, of the proximal end of a second support member of a bicycle hanger may be received by a slot on the fourth side of the main body. This may provide a bicycle hanger having improved stability, particularly if a user is placing significant forces on the bicycle, and hence the hanger, during use. In some embodiments, the slot that receives a portion of the first support member may be at a different height than the slot that receives a portion of the second support member, e.g. as described below.

In some embodiments, each bicycle hanger may comprise portions, e.g. first and second support members, that are attached to the main body at two different heights. For example, each bicycle hanger may have a first support member that is attached to the main body at a first height and a second support member that is attached to the main body at a second height. In some embodiments, the first support member of a bicycle hanger may be straight, such that a distal end and a proximal end of the first support member are at the same vertical position, and the second support member of the bicycle hanger may be curved or angled, such that a distal end and a proximal end of the second support member are at differing vertical positions. Preferably, the distal end of the first support member and the distal end of the second support member are substantially vertically aligned, i.e. at substantially the same height to form the space configured to receive a seat post of a bicycle.

By providing bicycle hangers in which the attachment portions of the first and second support members are vertically offset from one another, for instance, embodiments of the present disclosure provide a bicycle repair stand in which a first bicycle hanger and the second bicycle hanger are attachable to the main body in any of the following configurations: (a) the distal end of the first bicycle hanger arm and the distal end of the second bicycle hanger arm are both at a first height; (b) the distal end of the first bicycle hanger arm and the distal end of the second bicycle hanger arm are both at a second height; and (c) the distal end of the first bicycle hanger arm is at the first height and the distal end of the second bicycle hanger arm is at the second height, wherein the second height is vertically offset from the first height. The second height may be vertically offset from the first height by a desired amount to provide a user with different bicycle mounting options and/or to reduce or prevent interference between bicycles as is described herein. For example, the second height may be vertically offset from the first height by about three inches or more, alternatively by about four inches or more, alternatively by about five inches or more.

In some embodiments, for instance, the second bicycle hanger arm may be rotated 180° from the first bicycle hanger arm, i.e. flipped upside-down, such that the distal end of the second bicycle hanger is vertically offset from the distal end of the first bicycle hanger. Where each bicycle hanger has a straight support member and a vertically curved or angled support member, the vertically curved or angled support member of the first bicycle hanger may extend upward (moving toward the distal end of the hanger) and the vertically curved or angled support member of the second bicycle hanger may extend downward (moving toward the distal end of the hanger), or vice-versa. Because the proximal ends of the support members of the two bicycle hangers located on the same side of the main body are positioned at different heights, they will not interfere with one another during attachment of the bicycle hangers to the main body. For instance, the third side of the main body and the fourth side of the main body may each comprise first and second slots at different heights, one of which receives a portion of the first bicycle hanger and the other of which receives a portion of the second bicycle hanger.

In some embodiments, the distal end of the first bicycle hanger arm and the distal end of the second bicycle hanger arm may be vertically aligned, either at a first height or a second height. In these embodiments, either both bicycle hangers are positioned with the distal end at the top or both bicycle hangers are rotated 180° so that the distal end is at the bottom. Where the proximal ends of the first and second support members of the two bicycle hangers located on the same side of the main body are positioned at different heights, they will not interfere with one another during attachment of the bicycle hangers to the main body. For instance, the third side of the main body and the fourth side of the main body may each comprise first and second slots at different heights, one of which receives a portion of the first bicycle hanger and the other of which receives a portion of the second bicycle hanger.

Each bicycle tool may be coupled to the first end of a cable. The second end of the cable may be coupled to the main body of the bicycle repair stand in any of a variety of manners. In some embodiments, the second end of each cable may be concealed within a portion of the main body. For example, the repair stand may comprise one or more ledges positioned interior to the sidewall(s) of the main body, the one or more ledges having a plurality of openings through which the cables pass. The second end of each cable may include an end cap, the end cap having a larger dimension, e.g. diameter, than both the cable and the opening through which the cable passes, such that the end cap of the cable is seated on the ledge and prevents the cable from fully passing through the opening. Once the cables are coupled to the main body in this manner, the interior compartment of the main body that contains the ledge and the end cap of the cables may be closed off by a cap or the like, thereby concealing the second end of each cable within the main body. In other embodiments, the second ends of the cables may be coupled to the main body in different manners, including for instance to an exterior element of the main body.

In some embodiments, the main body of the bicycle repair stand may include one or more protective plates that at least partially define the opening in which the set of bicycle repair tools are positioned when not in use. For example, the bicycle repair stand may include first and second protective plates, each at least partially making up the internal walls that defines the opening. The protective plates may be configured to prevent the tools from scratching or otherwise damaging the main body, particularly if released from a raised height.

In some embodiments, the set of bicycle tools may be suspended using as few cables as possible. For instance, the set of bicycle tools may include a plurality of hex keys rotatably coupled to a single cable, a plurality of wrenches rotatably coupled to a single cable, or both. Other bicycle tools may include one or more tire levers and one or more stand-alone wrenches (e.g. larger-sized wrenches) for example.

In some embodiments, the bicycle repair stand may include an air pump coupled to the main body. For instance, the air pump may comprise an external body member that is attached to the main body of the repair stand by one or more couplings, as in the illustrated embodiments, and/or elements of the air pump may be positioned within a portion of the main body of the repair stand and thus internally coupled to the main body.

Embodiments of the present disclosure are also directed to bicycle repair stands having a single bicycle hanger (as opposed to two bicycle hangers extending in substantially opposite directions) and utilizing any of the technology disclosed herein.

BRIEF DESCRIPTION OF THE DRAWINGS

A clear conception of the advantages and features of one or more embodiments will become more readily apparent by reference to the exemplary, and therefore non-limiting, embodiments illustrated in the drawings.

DETAILED DESCRIPTION OF THE INVENTION

Figure 1:
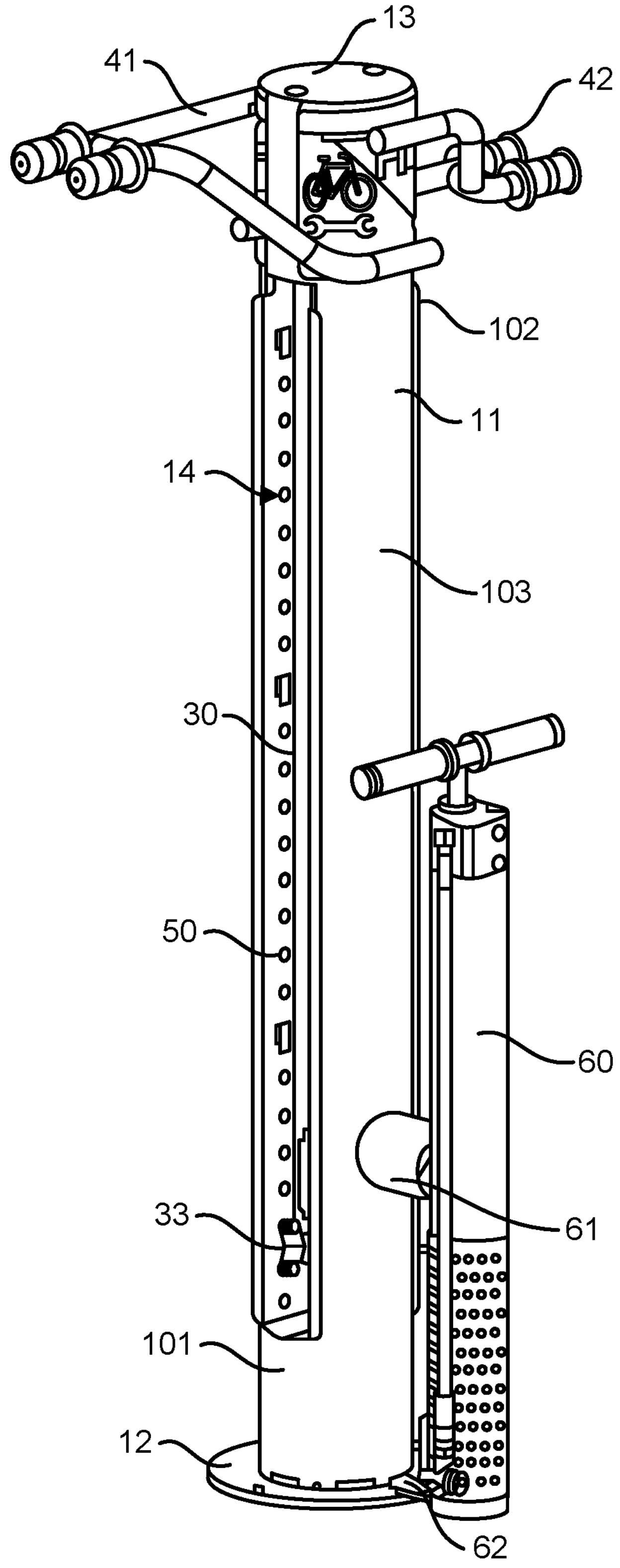
FIG. 1 is a perspective view of a first embodiment of a bicycle repair stand in accordance with the present disclosure.
Figure 2:
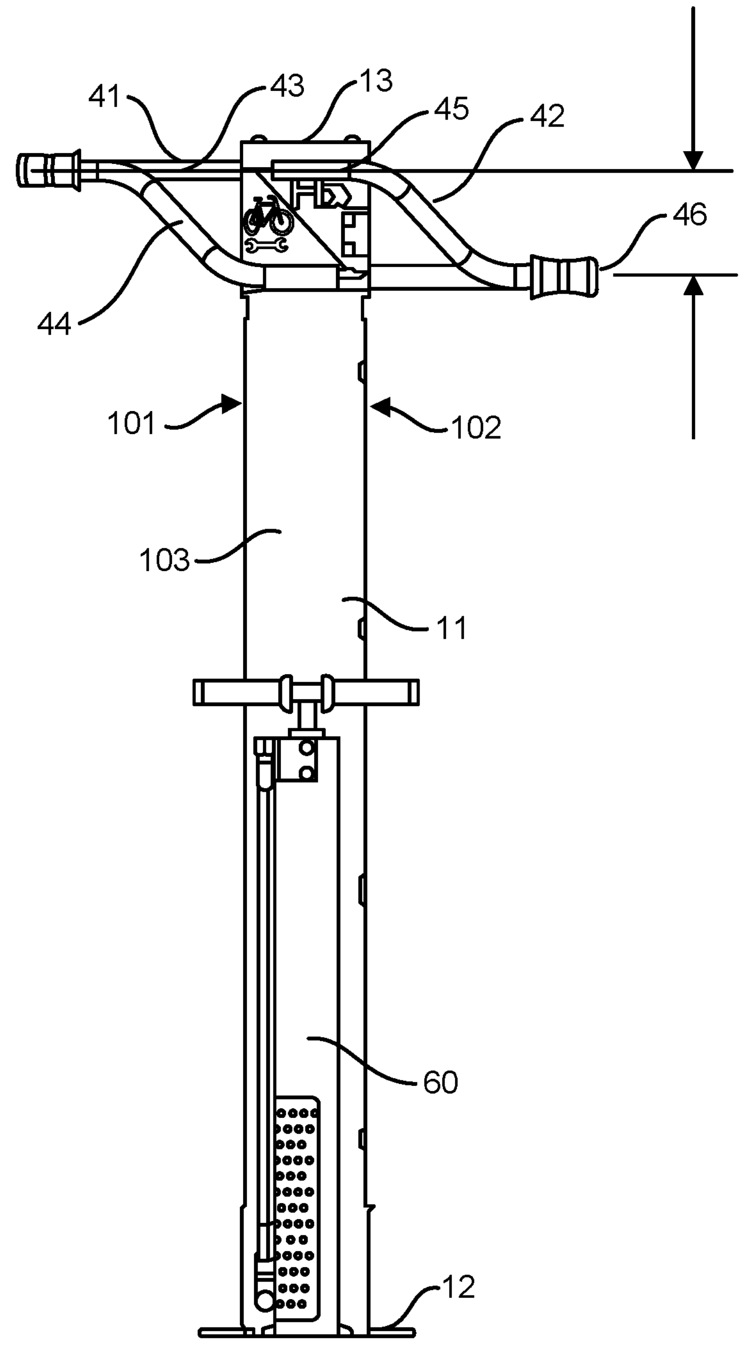
FIG. 2 is a side elevation view of the embodiment illustrated in FIG. 1.
Figure 3:
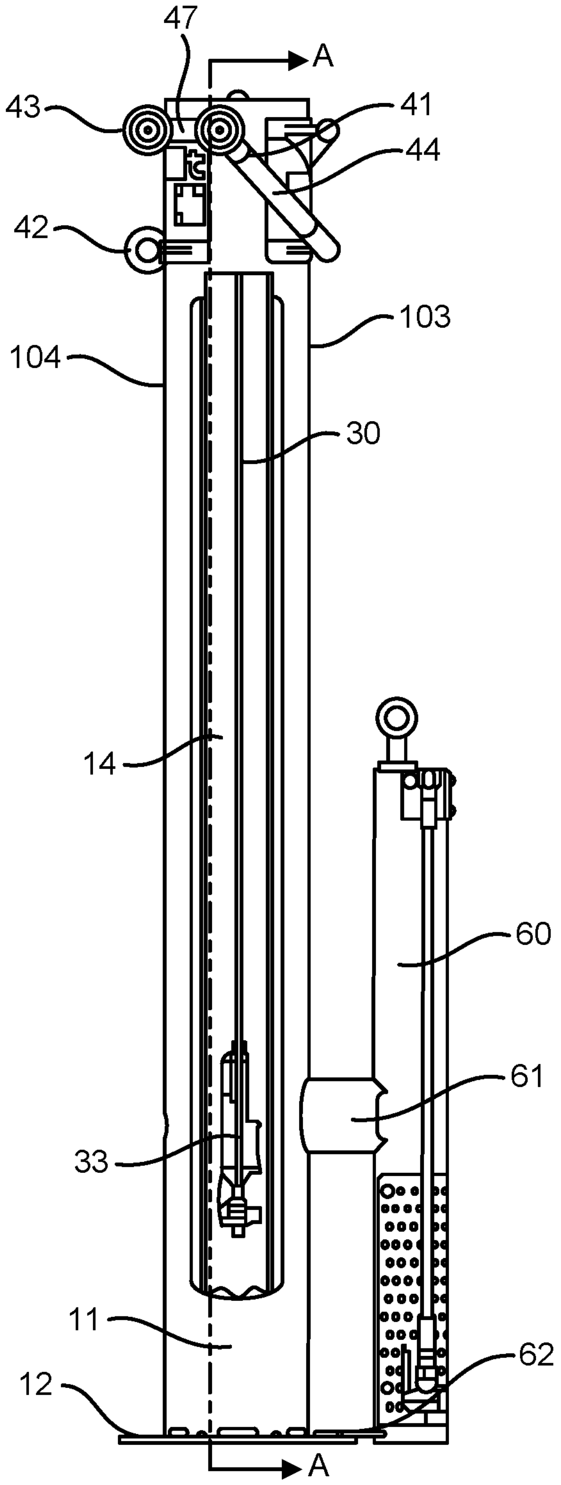
FIG. 3 is a front elevation view of the embodiment illustrated in FIG. 1.

Embodiments of the present disclosure are directed to a bicycle repair stand that provides a number of improvements over those currently on the market, including for example increased flexibility and a dual-sided arrangement. A bicycle repair stand 10 in accordance with an embodiment of the present disclosure is illustrated in FIGS. 1-6.

The bicycle repair stand 10 illustrated in FIGS. 1-6 comprises a main body 11, a plurality of cables 30, and a pair of bicycle hangers 40. Each of the plurality of cables 30 comprises a first end 31 and a second end 32. A bicycle tool 33 or a plurality of bicycle tools is/are attached at the first end of each cable 30. Together, the bicycle tools 33 may form a set which allows a user to make most common bicycle repairs and/or adjustments.

The main body 11 spans from a lower end to an upper end. The lower end of the main body 11 comprises a base 12, which is configured to be mounted to a ground surface. For example, the base 12 may include a plurality of holes 21 through which bolts (not shown) can be extended to affix the bicycle repair stand 10 to the ground. In these embodiments, the bicycle repair stand 10 is configured to be permanently affixed to the ground so that it is not moved by users of the bicycle repair stand. The base 12 may be integrally formed with the main body 11 or the base may be attached to the main body by any conventional manner, e.g. fasteners, welding, or the like. The upper end of the main body 10 may be closed off, e.g. with a cap 13. In the illustrated embodiment, the main body 11 is a cylindrical tube, although other cross-sectional shapes can be utilized, such as rectangular or other polygonal tubes.

The repair stand 10 illustrated in FIGS. 1-6 includes a first bicycle hanger 41 and a second bicycle hanger 42. The first bicycle hanger 41 extends laterally from the upper end of the main body 11 and more particularly from a first side 101 of the main body (though it need not necessarily be affixed to the first side of the main body, as is shown and described herein). The second bicycle hanger 42 also extends laterally from the upper end of the main body 11, but the second bicycle hanger extends from a second side 102 of the main body, with the second side being directly opposite the first side (though it need not necessarily be affixed to the second side of the main body, as is shown and described herein). As such, the first and second bicycle hangers 41, 42 extend in substantially opposing directions (i.e., forming an angle of about 180° with one another when viewed from above).

The bicycle repair stand 10, and more particularly the main body 11, comprises one or more attachment points for a plurality of cables 30. In the illustrated embodiment embodiment, the main body 11 comprises an attachment point for a single set of cables 30 by which the cables are accessible from both the first and second sides 101,102 of the repair stand. In other (non-illustrated) embodiments, however, the main body 11 may comprise multiple attachment points for a plurality a cables 30, such that a first set of cables may be accessible on at least the first side 101 of the repair stand (and optionally both the first and second sides of the repair stand) and a second set of cables may be accessible on at least the second 102, opposing side of the repair stand (and optionally both the first and second sides of the repair stand).

Specifically, in the illustrated embodiment, the main body 11 comprises an opening 14 that spans between two opposing sides—the first and second sides 101,102—of the bicycle repair stand 10. The cables 30 are suspended within the opening 14 when not in use, such that the cables—and more particularly the bicycle tools 33 at the first ends 31 of the cables—are accessible from both the first and second sides 101,102 of the repair stand 10.

The cables 30 may be of a desired length to allow the tools 33 at the first ends 31 of the cables 30 to reach the relevant portion or portions of a bicycle supported by both of the first and second bicycle hangers 41, 42. Correspondingly, the opening 14 may have a sufficient length to receive the length of the cable 30 plus the lengths of the tools 33 that are coupled to the cables. In some embodiments, for example, the opening 14 may span at least 60% of the vertical height of the main body 11, alternatively at least 65% of the vertical height of the main body, alternatively at least 70% of the vertical height of the main body, alternatively at least 75% of the vertical height of the main body, alternatively at least 80% of the vertical height of the main body.

Figure 4:
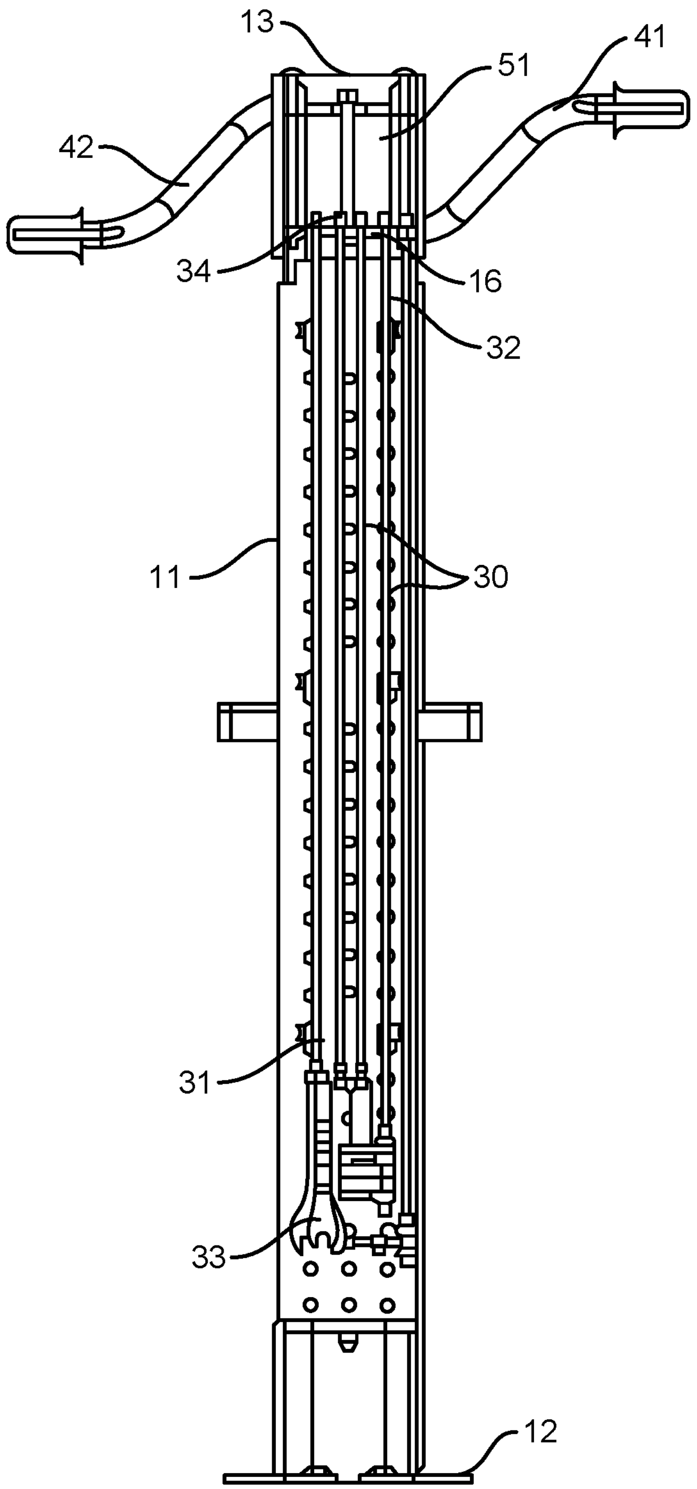
FIG. 4 is a cross-sectional view of the embodiment shown in FIG. 1, taken along line A-A in FIG. 3.
Figure 5:
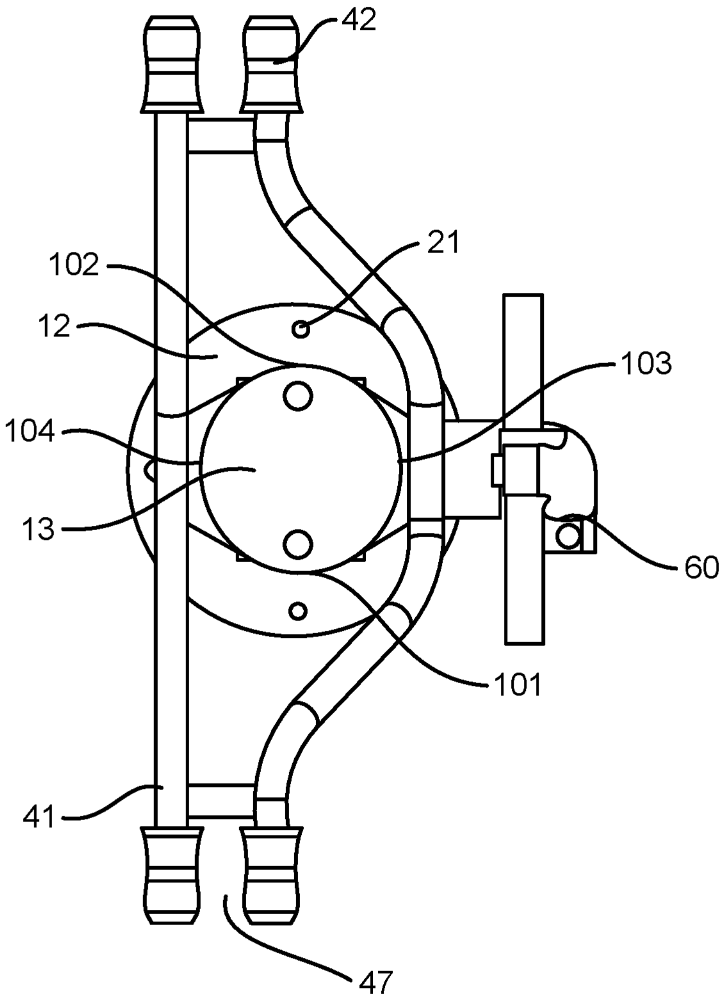
FIG. 5 is a top plan view of the embodiment shown in FIG. 1.
Figure 6:
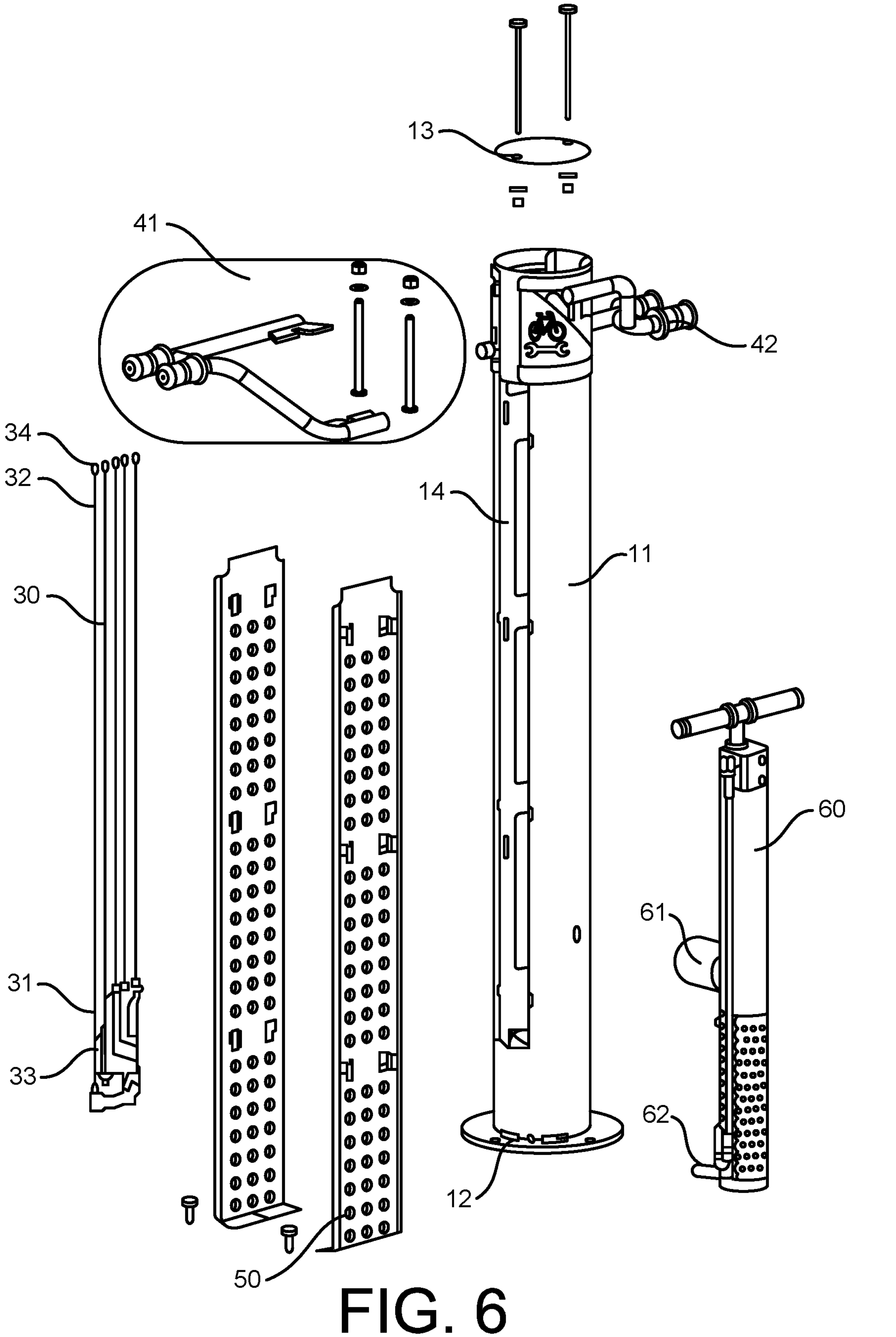
FIG. 6 is an exploded perspective view of the embodiment shown in FIG. 1.

In the illustrated embodiment, the second ends 32 of the cables extend upwards into an upper, interior portion 15 of the main body 11, within which the cables 30 are attached to the main body, as may best be seen in FIG. 4. In this configuration, the second end 32 of each cable 30 includes a head portion 34. The cables 30 are extended through a slot formed in a ledge 16 that is positioned in the main body interior portion 15 of the main body 11. The head portion 34 of each cable 30 is larger than the slot, so that the head portion cannot fit through the slot but is instead seated on the ledge 16, thereby suspending the cable from the ledge 16. When the cap 13 is affixed to the main body 11, the head portions 34 of the cables are concealed within the interior portion 15 of the main body 11 so that removal of the cables 30 is prevented.

Such a configuration is advantageous to protect the cables 30 from the weather as well as from detachment and/or tampering. In some embodiments, the tools 33 may be coupled to retractable cables 30 that, when not in use, retract to the top of opening 14, such that the tools are positioned just below the interior compartment 15 and more specifically immediately below the underside of ledge 16. In some embodiments, the tools 33 may include magnets thereon to hold the tools to a portion of the main body 11, such as protective plate 50 or a different portion of a wall that defines the opening 14, when not being used.

In other (non-illustrated) embodiments, the cables 30 may be coupled to the main body 11 in other manners, including for example looping or spooling the second end of the cables 32 around an element which may or may not be concealed within an interior compartment 15 of the main body 11, and/or coupled to other portions of the main body, including for example an element positioned within opening 14, an exterior surface of the main body, an element extending from the exterior surface of the main body, etc.

Figure 10:
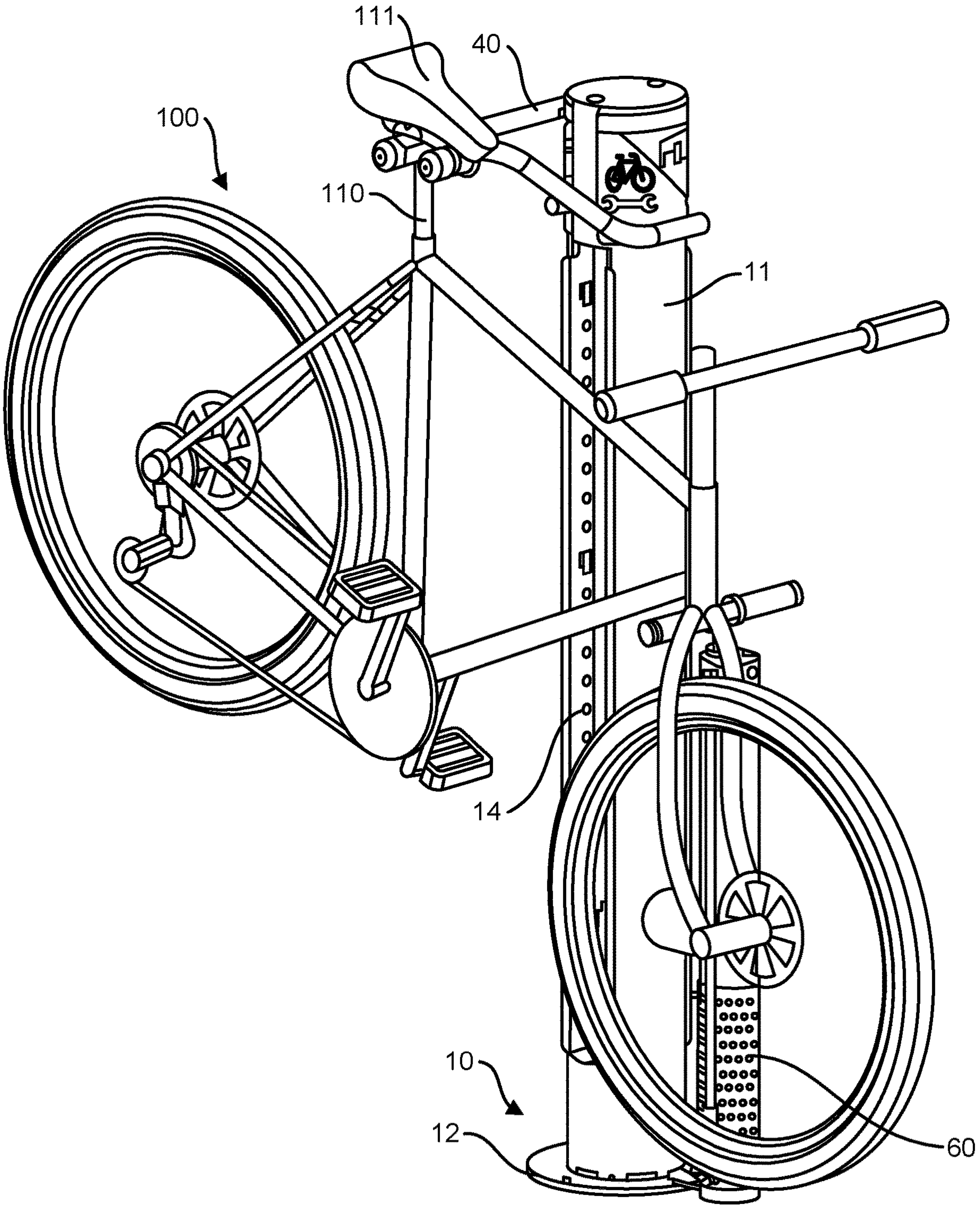
FIG. 10 is a perspective view of a bicycle repair stand in accordance with the present disclosure, showing a bicycle supported by a single hanger arm.

The bicycle repair stand 10 may be configured to have one or more bicycle hangers 40. In FIGS. 1-6, the bicycle repair stand 10 is shown having a first bicycle hanger 41 extending from a first side of the main body 11 and a second bicycle hanger 42 extending from a second, opposing side of the main body. In other arrangements, however, the bicycle repair stand 10 shown in FIGS. 1-6 may be provided with only a single bicycle hanger 40, such as is shown in FIGS. 10 and 12.

In some embodiments, such as that shown in FIGS. 1-6, the first and second bicycle hangers 41, 42 are positioned at different heights, i.e. are vertically displaced from one another. In some embodiments, for instance, the first and second bicycle hangers 41, 42 may be vertically displaced by at least three inches, alternatively at least four inches, alternatively at least five inches, alternatively at least six inches. Unless otherwise stated, the vertical displacement between the first and second bicycle hangers 41, 42 is measured between the surface(s) of the first bicycle hanger 41 on which a portion of a bicycle is seated when in use and the surface(s) of the second bicycle hanger 42 on which a portion of a bicycle is seated when in use. The vertical displacement of the first and second bicycle hangers 41, 42 may provide a user with different bicycle mounting options, e.g. depending on the user's height and/or preferred positioning of a bicycle for the intended repair or adjustment, and/or may reduce interference between two bicycles when bicycles are mounted on both hangers.

In other embodiments, however, the first and second bicycle hangers 41, 42 may be positioned at the same height. The bicycle repair stand 10 may also be configured so that, during assembly, each of first and second bicycle hangers 41, 42 are attachable at more than one height, such that the height of each bicycle hanger 41, 42 may be selected during installation. For instance, both the first bicycle hanger 41 and the second bicycle hanger 42 may be positioned at the same first height, both the first bicycle hanger and the second bicycle hanger may be positioned at the same second height, or the first bicycle hanger may be positioned at the first height and the second bicycle hanger may be positioned at the second height, or any combination thereof. The second height may be vertically offset from the first height by at least three inches, alternatively at least four inches, alternatively at least five inches, alternatively at least six inches. The illustrated embodiment is configured to allow for any of these arrangements, as shown for example in FIGS. 13A to 13F.

The first and second bicycle hangers 41, 42 may have a variety of configurations. In the illustrated embodiment, each bicycle hanger 40 includes a first support member 43 and a second support member 44. Each of the first and second support members 43, 44 may span between a proximal end 45, which is attached to the main body 11, and a free distal end 46. The first and second support members 43, 44 each extend substantially perpendicularly from the main body 11 (e.g. when viewed from above).

Figure 11:
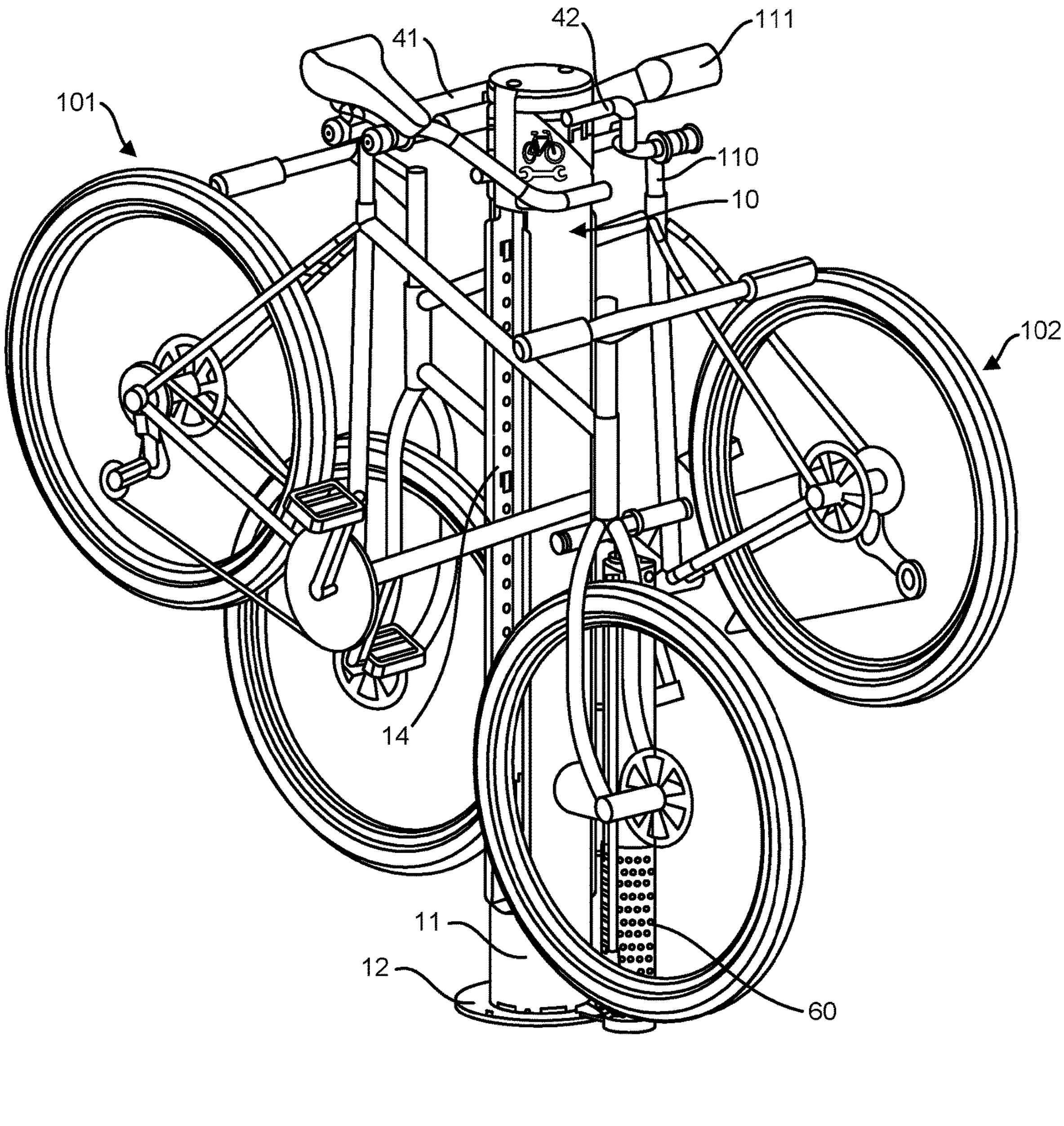
FIG. 11 is a perspective view of a bicycle repair stand in accordance with the present disclosure, showing two bicycles supported by hanger arms extending in opposite directions.
Figure 12B:
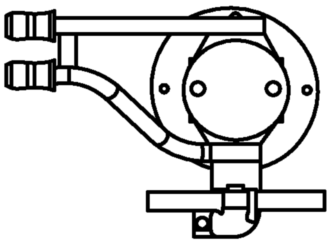
FIG. 12B is a top plan view of a bicycle repair stand having the hanger arm configuration of FIG. 12A.
Figure 12D:
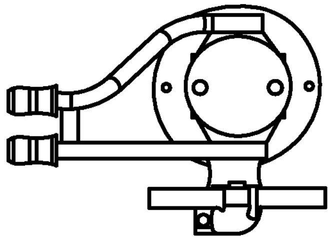
FIG. 12D is a top plan view of a bicycle repair stand having the hanger arm configuration of FIG. 12C.
Figure 12A:
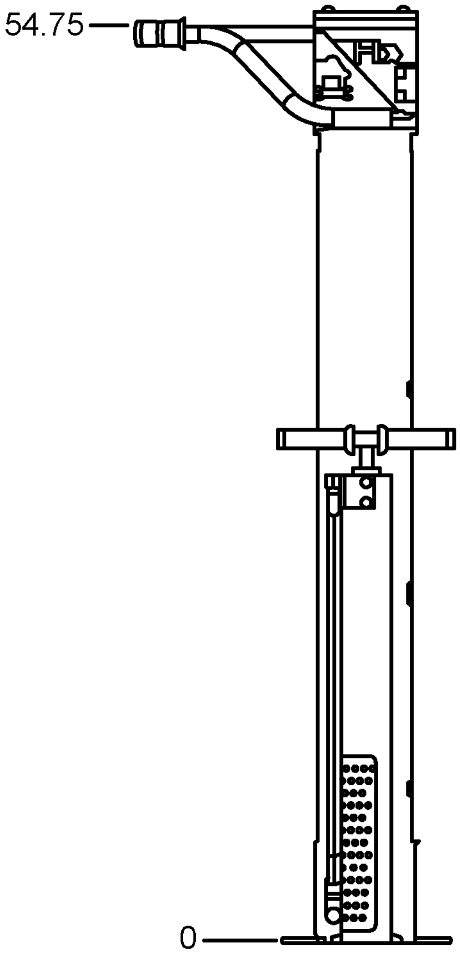
FIG. 12A is a side elevation view of a bicycle repair stand in accordance with the present disclosure, showing a first hanger arm configuration for a single-sided repair kit.
Figure 12C:
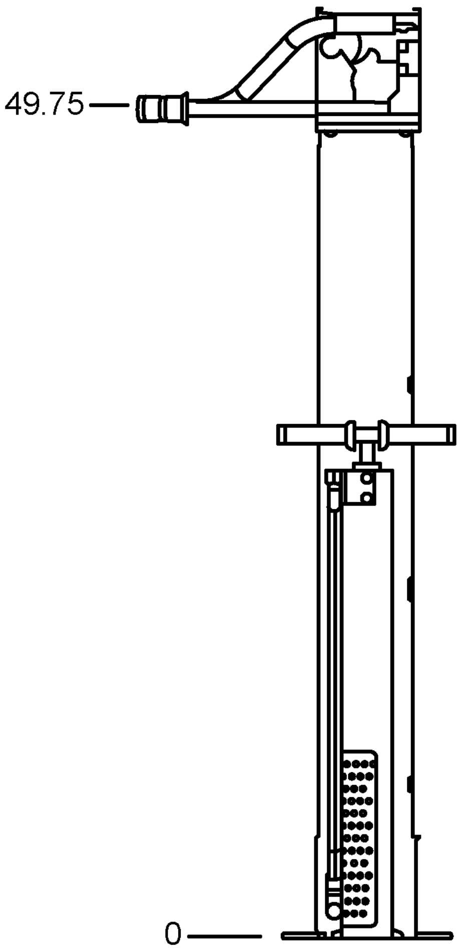
FIG. 12C is a side elevation view of a bicycle repair stand in accordance with the present disclosure, showing a second hanger arm configuration for a single-sided repair kit.
Figure 13B:
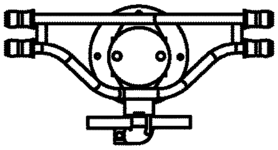
FIG. 13B is a top plan view of a bicycle repair stand having the combination of hanger arm configurations of FIG. 13A.
Figure 13D:
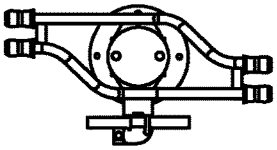
FIG. 13D is a top plan view of a bicycle repair stand having the combination of hanger arm configurations of FIG. 13C.
Figure 13F:
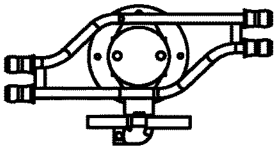
FIG. 13F is a top plan view of a bicycle repair stand having the combination of hanger arm configurations of FIG. 13E.
Figure 13A:
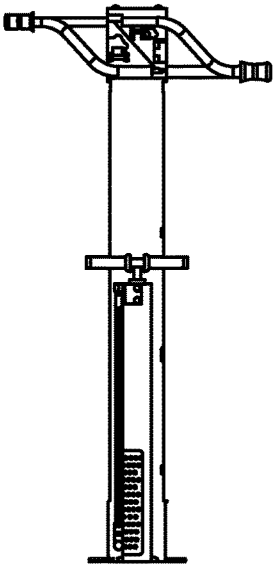
FIG. 13A is a side elevation view of a bicycle repair stand in accordance with the present disclosure, showing a first combination of hanger arm configurations for a double-sided repair kit.
Figure 13C:
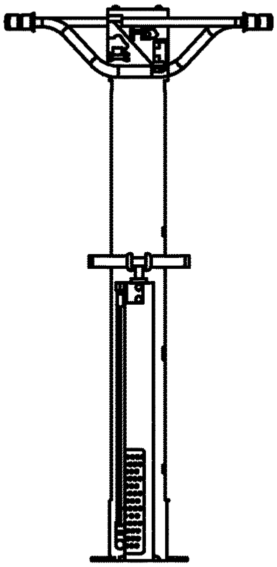
FIG. 13C is a side elevation view of a bicycle repair stand in accordance with the present disclosure, showing a second combination of hanger arm configurations for a double-sided repair kit.
Figure 13E:
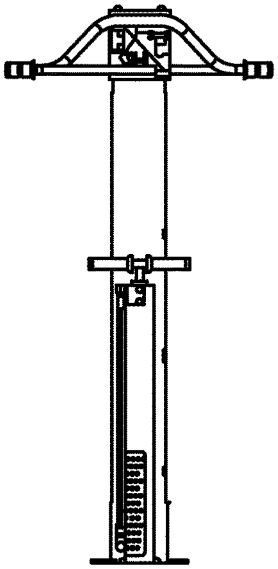
FIG. 13E is a side elevation view of a bicycle repair stand in accordance with the present disclosure, showing a third combination of hanger arm configurations for a double-sided repair kit.

In the illustrated embodiment, the first and second support members 43, 44 together define a space 47 configured to receive a portion of a bicycle, such as the seat post of a bicycle. When a seat post of a bicycle is placed within the space 47, the bicycle is supported by the hanger 40, and more particularly by the first and second support members 43, 44, in an elevated position above the ground surface, e.g.

as shown in FIGS. 10-11. In some embodiments, other portions of the bicycle frame may be received by the space 47, either in addition to or as an alternative to the seat post, and the bicycle supported by the hanger 40, and more particularly by the first and second support members 43, 44. As shown in the illustrated embodiment, the space 47 may desirably be formed by the distal ends 46 of the first and second support members 43, 44.

Each of the first and/or second support members 43, 44 may include an end cap 48 made from a material that prevents scratches and minimizes damage to objects that contact the support members, e.g. the frame of a bicycle. For instance, the support members 43, 44 may each comprise an end cap formed of a material that is softer (i.e., has a lower durometer) than the material of which the support member is formed. Additionally or alternatively, the support members 43, 44 may be coated or otherwise formed from materials that prevent scratching and minimize any damage associated with contacting a bicycle mounted thereon.

Other types of bicycle hangers 40 are also contemplated. In another (non-illustrated) embodiment, for instance, the bicycle hanger 40 may comprise one or more clamps, e.g. one or more C-clamps, that can hold one or more portions of a bike, such as the frame or tire, while the bicycle is serviced. In such an embodiment, the bicycle hanger may comprise only one support member, though the use of two support members 43, 44 would provide a more stable and durable hanger 40.

The bicycle hangers 40 may also be attached to the main body 11 in any of a variety of manners. In some (non-illustrated) embodiments, for instance, the proximal ends 45 of the support members 43, 44 may be attached to the same side of the main body 11 from which they extend; i.e. the support members of the first bicycle hanger 41 may be attached to the first side 101 of the main body and the support members of the second bicycle hanger 42 may be attached to the second, opposing side 102 of the main body. Alternatively, one or more of the bicycle hangers 40 may be attached via cap 13, similar to the design shown and described in U.S. Pat. No. 9,498,880, the entirety of which is incorporated by reference herein.

In other embodiments, including the illustrated embodiment, however, the proximal end 45 of each of the support members 43, 44 of a bicycle hanger 40 is attached to a side of the main body 11 that is positioned about 90° from the side of the main body from which the support member extends. For instance, the first support member 43 of the bicycle hanger 40 may be attached to the third side 103 of the main body 11 and the second support member 44 of the bicycle hanger may be attached to the fourth side 104 of the main body, or vice versa.

Figure 7:
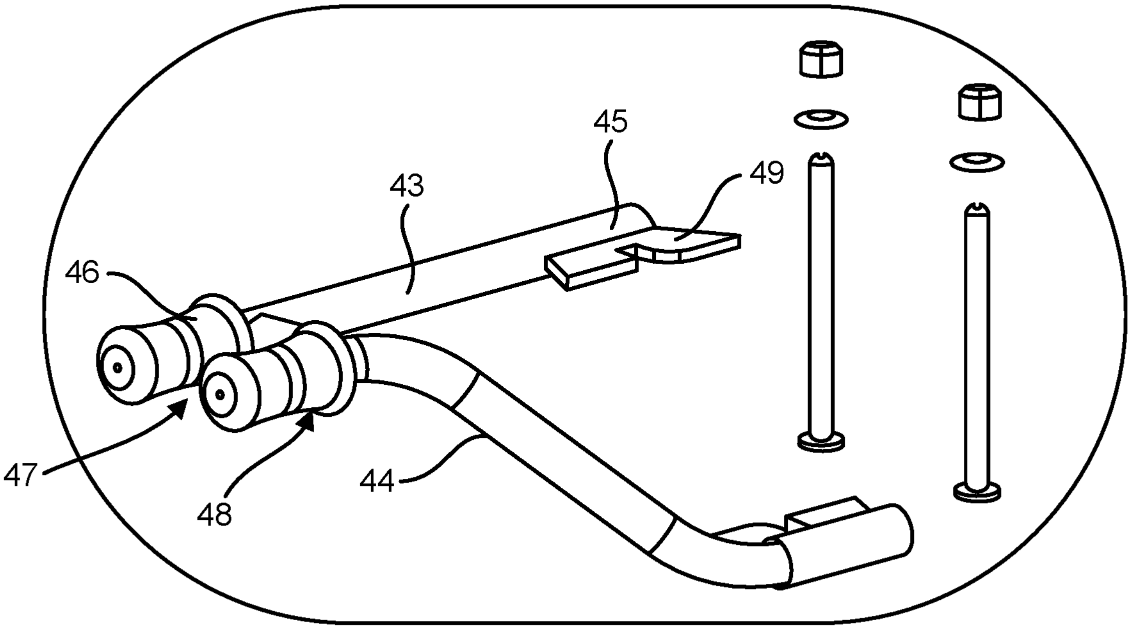
FIG. 7 is a perspective view of an embodiment of a hanger arm for a bicycle repair stand in accordance with the present disclosure.
Figure 8:
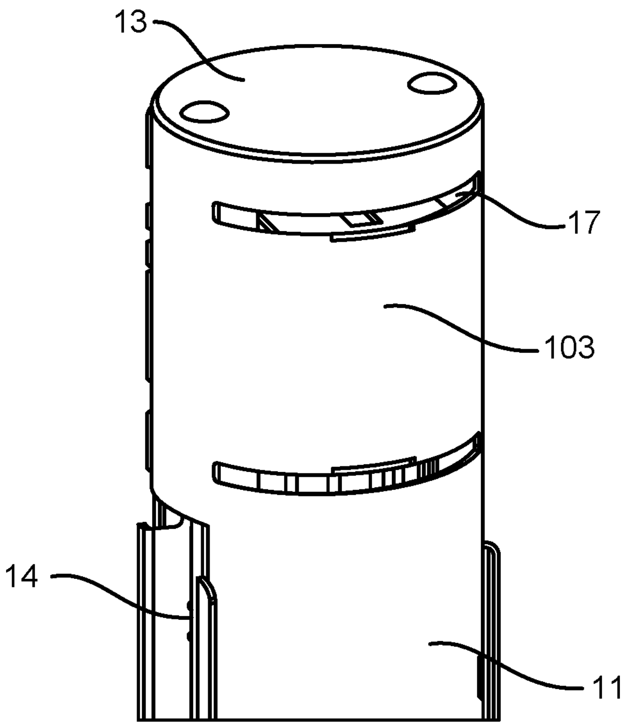
FIG. 8 is a perspective view of the top portion of the main body of a bicycle repair stand in accordance with the present disclosure.
Figure 9:
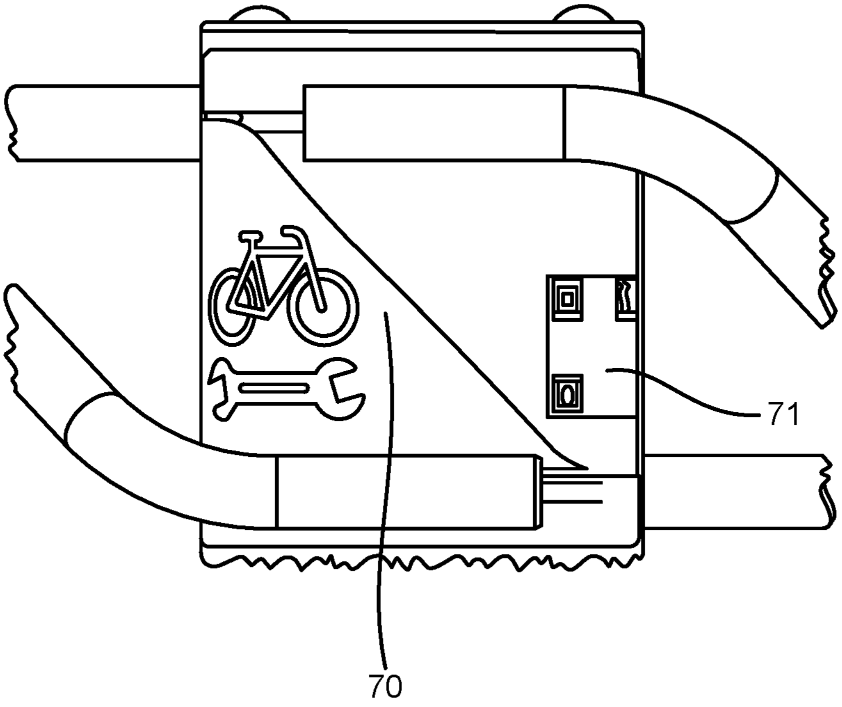
FIG. 9 is a side elevation view of the top portion of the main body of a bicycle repair stand in accordance with the present disclosure, showing the attachment of first and second bicycle hangers.

The exact manner of coupling the bicycle hanger 40 to the main body 11 may vary. As shown in FIG. 7, each support member 43, 44 may comprise a mounting plate 49 at the proximal end, the mounting plate 49 extending inward toward the other support member. Each of the third and fourth sides 103, 104 of the main body may comprise a slot 17, e.g. as may best be seen in FIG. 8. Each slot 17 may be configured to receive a mounting plate 49 and then the mounting plate may be affixed to an interior of the main body 11, e.g. to a corresponding plate positioned within interior space 15 of the main body, by one or more fasteners, e.g. bolts, or other conventional manners. In other (non-illustrated) embodiments, the support members 43, 44 may be attached to the third and fourth sides 103, 104 of the main body by other manners, such as bolts passing through a portion of the proximal end 45 of the support member 43, 44 and the sidewall of the main body 11 or, less desirably, welding a portion of the proximal end of the support member to the main body.

Where the support members 43, 44 of a bicycle hanger 40 are mounted to third and fourth sides 103, 104 of the main body 11, the distance between the proximal ends 45 of the support members should be substantially the same as or slightly larger than the diameter of the main body 11 (or the distance between the sidewalls that make up the third and fourth sides 103, 104 of the main body where, for example, the main body has a polygonal cross-sectional shape). That distance will typically be significantly greater than the distance desirable for forming the space 47 into which a portion of a bicycle frame, such as the seat post, is to be positioned. Accordingly, in some embodiments, including the illustrated embodiment, at least one of the support members 43, 44 is curved or angled inward, such that the distal ends 46 of the support members are closer together than the proximal ends 45 of the support members. Though in the illustrated embodiments, only support member 44 is shown as angling or curving inward, it is also contemplated that both support members 43, 44 may be angled or curved inward in order to reduce the gap between them at the distal end 46 of the bicycle hanger 40.

In order to provide for the mounting of a bicycle hanger 40 at a plurality of different heights and/or to facilitate the mounting of first and second bicycle hangers 41, 42 thereto, the third side 103 and the fourth side 104 of the main body 11 may each comprise a plurality of slots 17, each slot being positioned at a different height. In the illustrated embodiment, for instance, each of the third and fourth sides 103, 104 of the main body 11 comprises a pair of vertically separated slots 17, each of which is configured to receive a mounting plate 49 associated with a support member of a bicycle hanger 40. Similarly, in other (non-illustrated) embodiments, each of the third and fourth sides 103, 104 of the main body may comprise apertures or sets of apertures at multiple different heights, each of which is configured to receive a fastener, such as a bolt, to directly couple a proximal end 45 of a bicycle hanger 40 to the sidewall of the main body 11.

In some (non-illustrated) embodiments, each support member 43, 44 of a bicycle hanger 40 may be straight or substantially straight and have an axis that runs perpendicular or substantially perpendicular to the ground surface, e.g. as with the support members shown in U.S. Pat. No. 9,498,880, the entirety of which is incorporated herein by reference. However, in other embodiments, including the illustrated embodiment, at least one of the support members 43, 44 of the bicycle hanger 40 may be curved or angled upward or downward, such that the proximal end 45 of the support member is at a different height than the distal end 46. Though in the illustrated embodiments, support member 43 is shown as being straight and support member 44 is shown as angling or curving upward/downward (depending on the orientation of the hanger 40), it is also contemplated that both support members 43, 44 may be angled or curved upward/downward if desired.

The illustrated embodiment of bicycle hanger 40 enables the mounting of first and second bicycle hangers 41, 42 at the same vertical elevation without the support members 43, 44 of the first bicycle hanger and the support members of the second bicycle hanger interfering with one another. Consider, for example, FIGS. 13A to 13F, which shows a bicycle service stand 10 configured so that first and second bicycle hangers 41, 42 can be arranged in three different arrangements.

On the left, a first bicycle hanger 41 is attached to the main body 11 such that the bicycle hanger, and more particularly the distal end 46 of the bicycle hanger, is at a first height and a second bicycle hanger 42 is attached to the main body 11 such that the bicycle hanger, and more particularly the distal end of the bicycle hanger, is at a second height, the second height being lower (e.g., by about five inches) than the first height.

If each bicycle hanger 41, 42 instead comprised support members 43, 44 that did not change elevation, i.e. for which the proximal end 45 and the distal end 46 were at the same height, such an arrangement could still be achieved without interference. For instance, the proximal ends 45 of the support members 43, 44 of the first bicycle hanger 41 could be coupled to slots 17 on the third and fourth sides 103, 104 of the main body 11 that were positioned at the first height and the proximal ends of the support members of the second bicycle hanger 42 could be coupled to slots on the third and fourth sides 103, 104 of the main body 11 that were positioned at the second height. The same would be true if both support members 43, 44 changed elevation, e.g. the proximal ends 45 of the support members 43, 44 of the first bicycle hanger 41 could be coupled to slots 17 on the third and fourth sides 103, 104 of the main body 11 that were positioned at the second height and the proximal ends of the support members of the second bicycle hanger 42 could be coupled to slots on the third and fourth sides 103, 104 of the main body 11 that were positioned at the first height.

In the middle, a first bicycle hanger 41 is attached to the main body 11 such that the bicycle hanger, and more particularly the distal end 46 of the bicycle hanger, is at a first height and a second bicycle hanger 42 is attached to the main body 11 such that the bicycle hanger, and more particularly the distal end of the bicycle hanger, is at the same first height. On the right, a first bicycle hanger 41 is attached to the main body 11 such that the bicycle hanger, and more particularly the distal end 46 of the bicycle hanger, is at a second height and a second bicycle hanger 42 is attached to the main body 11 such that the bicycle hanger, and more particularly the distal end of the bicycle hanger, is at the same second height.

For these two arrangements, if each bicycle hanger 41, 42 instead comprised support members 43, 44 that did not change elevation, i.e. for which the proximal end 45 and the distal end 46 were at the same height, and if the bicycle hangers were coupled to sides 103, 104 of the main body 11, the support members of the first and second bicycle hangers 41, 42 would interfere with one another (unless the third and fourth sides of the main body were widened to allow the support members to be adjacent to one another, but that would extend the distance between the arms, making it harder for a single set of tools to be used to repair bicycles supported by both hangers). The same would be true if both support members 43, 44 of each bicycle hanger 40 changed elevation.

By providing bicycle hangers 40 in which a first support arm 43 does not change elevation and a second support arm 44 does change elevation (such that the proximal end 45 of the second support member is at a different height than the distal end 46), however, the first and second bicycle hangers 41, 42 can be mounted to the main body 11 at the same height without interference between the support arms of each hanger on the third and fourth sides 103, 104 of the main body where they are coupled to the main body. In the illustrated embodiment, the first and second bicycle hangers 41, 42 may each be positioned at the first height or the second height, but one could easily add additional height options, e.g. a third option, such as by adding additional slots 17 (or apertures if the proximal ends 45 of the support members 43, 44 were directly affixed to the sidewall of the main body) to the third and fourth sides 103, 104 of the main body.

By providing bicycle hangers 40 in which a first support arm 43 does not change elevation and a second support arm 44 does change elevation (such that the proximal end 45 of the second support member is at a different height than the distal end 46), all of these arrangements can be achieved using first and second bicycle hangers 41, 42 that are identical to one another, meaning that only one bicycle hanger 40 design need be manufactured.

Moreover, by having one of the support arms 44 of the bicycle hanger 40 be both curved/angled inward to narrow the gap between support arms 43,44 at the distal end 46 and curved/angled upward or downward (depending on the orientation of the bicycle hanger), the other support arm 43 of the bicycle hanger can be straight, simplifying manufacturing of the bicycle hanger. To provide the bicycle hanger 40 with improved strength at its distal end 46, the first and second support arms 43, 44 may be connected by one or more crossbars, such as can be seen in the top plan view of FIG. 5. Such crossbars, however, may also be excluded.

Embodiments of the bicycle repair stand 10 may also include one or more protective plates 50 configured to prevent the tools from damaging the main body 11, e.g. from chipping the paint of the main body. As shown in the embodiment illustrated in FIGS. 1-6, for example, the opening 14 in which the tools 33 are suspended may include one or more protective plates 50. More specifically, first and second protective plates 50 may be coupled to the main body, e.g. through the use of conventional fasteners, so as to form interior walls that define the side boundaries of the opening 14. As shown in the illustrated embodiment, the protective plates 50 may be perforated in order to prevent or reduce the build-up of moisture (e.g. from humidity).

Embodiments of the bicycle repair stand 10 may also include an air pump 60 coupled to the main body 11. The air pump 60 can be used to provide air to inflate the tires of a bicycle. In the illustrated example, the air pump 60 includes a hose with an air nozzle that is configured to be affixed to the stem of a bicycle tire. The user can thereupon actuate a pump handle (e.g., move the pump handle up and down) to force air into the tire. In some embodiments, the air pump 60 may comprise a pressure gauge, which indicates the pressure of a bicycle tire when the nozzle is properly connected to the bicycle tire.

The air pump 60 may be coupled to the main body by one or more brackets 61 that are attached directly to the main body and/or one or more brackets 62 that are attached to the base 12. In the illustrated embodiment, the pump 60 is coupled to the main body by one bracket 61 and one bracket 62. The brackets 61, 62 rigidly hold the pump 60 so that it cannot be removed by users of the bicycle service stand 10. In some embodiments, including the illustrated embodiment, the air pump 60 may be fully external from the main body 11. In such embodiments, the air pump 60 is desirably coupled to the third or fourth side 103,104 of the main body 11, e.g. so that it doesn't interfere with bicycles supported by the first or second bicycle hangers 41, 42, which extend from the first and second sides 101, 102 of the main body.

In alternative embodiments, a portion of the air pump 60 may be positioned in an interior space of the main body 11, such that the air pump is coupled to an interior of the main body. In such (non-illustrated) embodiments, for example, an air hose may extend through an aperture in the sidewall of the main body 11; an actuator for the pump such as a pump handle or a foot lever may extend from the sidewall of the main body; or both.

In some embodiments, the bicycle repair stand 10 may also include decal 70 that contains any of a variety of information. In some embodiments, the decal 70 may include a machine-scannable code, such as a QR code 71, which could by scanned by a user's phone and link to information such as videos and/or instructions on bike maintenance or repair using the tools 33 provided by the bicycle service rack 10. For example, the QR code 71 can be read by a user's phone, and the result can be to provide the user with a video on how to change a flat tire on a bicycle using the tools 33 provided by the bicycle service rack 10.

Referring now to FIGS. 10, the bicycle service rack 10 is shown with a single bicycle hanger 40 having a bicycle 100 positioned thereon. In this example, a seat post 110 of the bicycle 100 is positioned between the support members 43, 44 of the bicycle hanger 40, and the bicycle 100 is slid onto the support members so that a seat 111 of the bicycle 100 rests on the support members 43, 44. In this position, the bicycle 100 is suspended by the bicycle service rack 10 above the ground so that the bicycle can be easily serviced. For example, the tires can be easily spun during servicing of the bicycle. The tools 33 are easily accessible and can be used to service the bicycle 100. The user can simply select a tool 33, move it to a relevant portion of the bicycle 100, and use the tool 33 to service the bicycle 100. For example, a wrench can be pulled out of the opening 14 of the main body 11 and used to tighten or loosen the handlebars of the bicycle 100. Further, the pump 60 can be used to increase the pressure of the air in the tires of the bicycle 100.

Referring now to FIG. 11, the bicycle service rack 10 is shown with first and second bicycle hangers 41, 42 having first and second bicycles 101, 102 positioned thereon. In this example, a seat post 110 of the first bicycle 101 is positioned between the support members 43, 44 of the first bicycle hanger 41 and a seat post of the second bicycle 102 is positioned between the support members of the second bicycle hanger 42. The first bicycle 101 is slid onto the support members 43, 44 of the first bicycle hanger 41 so that a seat 111 of the first bicycle 101 rests on the support members 43, 44 and the second bicycle 102 is slid onto the support members of the second bicycle hanger 42 so that a seat of the second bicycle 102 rests on the support members. The first bicycle 101 and the second bicycle 102 do not interfere with one another, e.g. do not come into contact with one another, when positioned on first and second bicycle hangers 41, 42 in this manner. The tools 33 are easily accessible from both the first side 101 of the main body, from which the first hanger 41 extends, and the second side 102 of the main body, from which the second hanger 42 extends, and can be used to service both the first and second bicycles 101, 102. Because the tools 33 are accessible from both sides 101, 102 of the main body, e.g. by way of the opening 14 passing through the main body 11, either user can simply select a tool 33, move it to a relevant portion of his/her bicycle 101, 102, and use the tool 33 to service the bicycle. Moreover, though the first and second bicycle hangers 41, 42 are positioned at different heights, the bicycle service stand 10 is configured so that the tools 33 may be brought to the relevant portion of either bicycle 101, 102. The pump 60 is also configured such that it can be used to increase the pressure of the air in the tires of either bicycle 101, 102.

Figure 14:
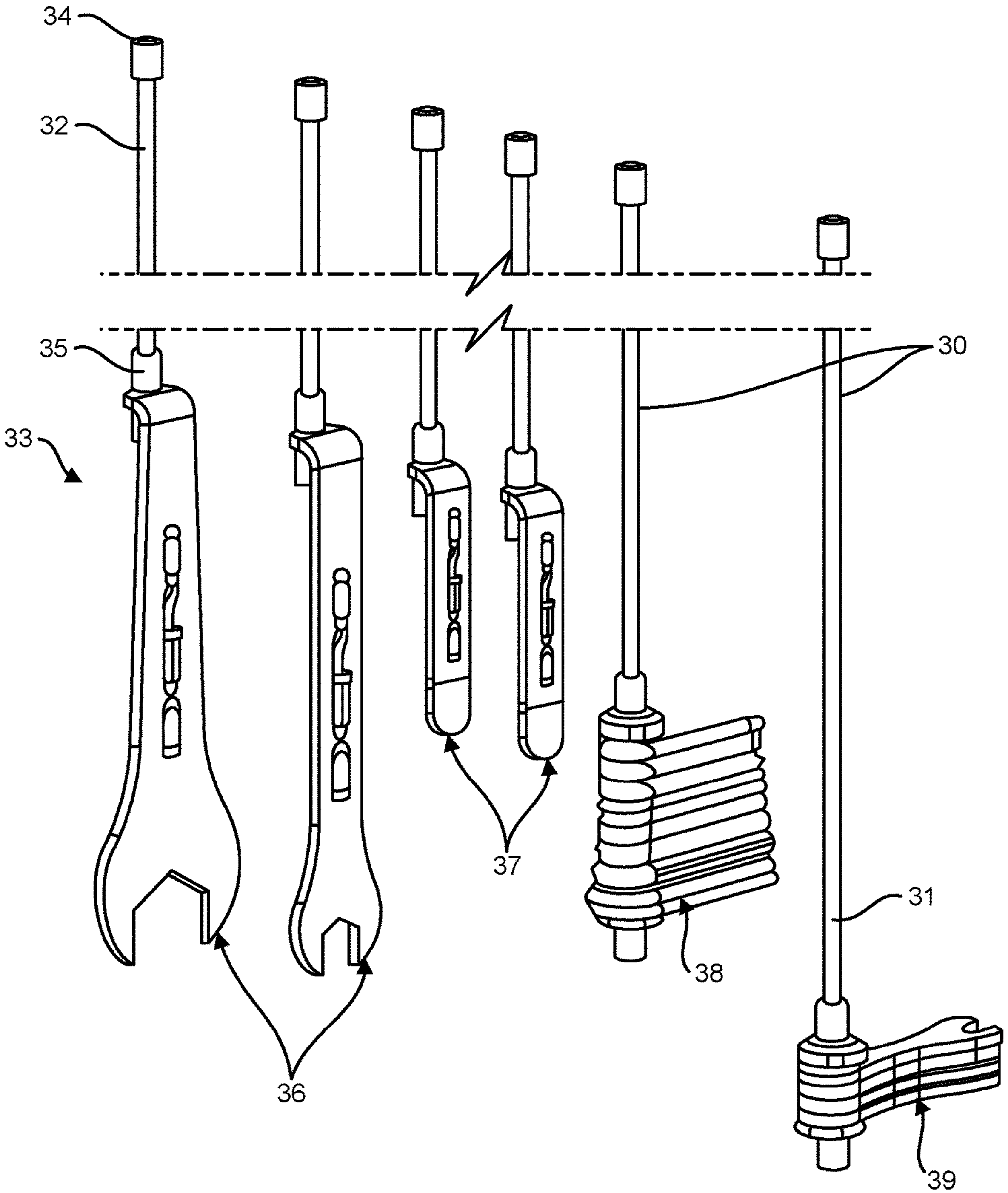
FIG. 14 is a perspective view of an example set of tools that may be included in a bicycle repair stand in accordance with the present disclosure.

Referring now to FIG. 14, an example set of cables 30 and bicycle repair/maintenance tools 33 is illustrated. Each tool 33 or plurality of tools is coupled to the second end 32 of a cable 30. Also illustrated is the first end 31 of each cable 30, including the head portion 34 which is used to couple the cable to the main body 11. In some embodiments, one or more of the tools 33 may be coupled to the second end 32 of the cable 30 using a swivel connection 35, which allows the tool 33 to be freely rotated during use without twisting the cable.

The set of tools 33 may comprise any of a variety of tools that are used in the maintenance and/or repair of bicycles. In the illustrated example, the set of tools 33 comprises, from left to right, two larger wrenches (32 mm and 15 mm) 36, two tire levers 37, a plurality of hex wrenches and screwdrivers 38, and a plurality of smaller wrenches (8 mm to 11 mm) 39. The plurality of hex wrenches and screwdrivers 38 are coupled to a single cable 30, such that the hex wrench of the desired size or the desired type and/or size of screwdriver can be rotated out from the rest for use and then rotated back in line with the rest for storage. Similarly, the plurality of smaller wrenches 39 are coupled to a single cable 30, such that the wrench of the desired size can be rotated out from the rest for use and then rotated back in line with the rest for storage. By combining similar tools in this manner, it is easier for a user to find the tool of the appropriate size. It also reduces the number of cables needed to support the tools, thereby allowing for a larger number of tools to be provided to a user with a limited amount of space (e.g. within opening 14).

It can be seen that the described embodiments provide a unique and novel bicycle repair stand that has a number of advantages over those in the art. While there is shown and described herein certain specific structures embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. A bicycle repair stand comprising:

a base configured to be mounted to a ground surface;

a main body extending vertically from the base;

a first bicycle hanger arm extending from a first side of the main body, the first bicycle hanger arm configured to hold a first bicycle in an elevated position above the ground surface;

a second bicycle hanger arm extending from a second side of the main body, the second bicycle hanger arm configured to hold a second bicycle in an elevated position above the ground surface;

a set of bicycle tools, each bicycle tool being coupled to a first end of a cable, a second end of the cable being coupled to the main body;

wherein the first side and the second side of the main body are substantially opposite one another; and wherein each bicycle tool is accessible from both the first side and the second side of the main body wherein the bicycle repair stand is configured to hold the first bicycle and the second bicycle at the same time.

2. The bicycle repair stand of claim 1, wherein the main body comprises an opening extending through the main body between the first and second sides, and wherein the set of bicycle tools is positioned within the opening.

3. The bicycle repair stand of claim 2, wherein the main body further comprises first and second protective plates that make up at least a portion of first and second internal walls that define the opening.

4. The bicycle repair stand of claim 1, wherein the second bicycle hanger arm is vertically offset from the first bicycle hanger arm.

5. The bicycle repair stand of claim 4, wherein the second bicycle hanger arm is vertically offset from the first bicycle hanger arm by at least 4 inches.

6. The bicycle repair stand of claim 4, wherein the repair stand is configured such that each bicycle tool can be brought to both:

i. a portion of the first bicycle that is serviced by the bicycle tool, and ii. a portion of the second bicycle that is serviced by the bicycle tool.

7. The bicycle repair stand of claim 6, wherein the main body comprises an opening extending through the main body between the first and second sides, wherein the set of bicycle tools is positioned within the opening, and wherein the opening spans at least 70% of the vertical height of the main body.

8. The bicycle repair stand of claim 1, wherein the first bicycle hanger arm and the second bicycle hanger arm are attachable to the main body in any of the following configurations:

(a) the first bicycle hanger arm and the second bicycle hanger arm are both at a first height;

(b) the first bicycle hanger arm and the second bicycle hanger arm are both at a second height; and (c) the first bicycle hanger arm is at the first height and the second bicycle hanger arm is at the second height;

wherein the second height is vertically offset from the first height by about five inches or more.

9. The bicycle repair stand of claim 1, wherein each bicycle hanger arm comprises a first support member and a second support member, the first and second support members forming a space configured to receive a seat post of a bicycle.

10. The bicycle repair stand of claim 9, wherein each of the first and second support members comprises an end cap formed of a material that is softer than the material of which the support member is formed.

11. The bicycle repair stand of claim 9, wherein the first support member is straight, such that a distal end and a proximal end are at the same vertical position; and the second support member is curved or angled, such that a distal end and a proximal end are at differing vertical positions;

wherein the distal end of the first support member and the distal end of the second support member are vertically aligned to form the space configured to receive a seat post of a bicycle at a distal end of the bicycle hanger arm.

12. The bicycle repair stand of claim 11, wherein the first bicycle hanger arm and the second bicycle hanger arm are attachable to the main body in any of the following configurations:

(a) the distal end of the first bicycle hanger arm and the distal end of the second bicycle hanger arm are both at a first height;

(b) the distal end of the first bicycle hanger arm and the distal end of the second bicycle hanger arm are both at a second height; and (c) the distal end of the first bicycle hanger arm is at the first height and the distal end of the second bicycle hanger arm is at the second height;

wherein the second height is vertically offset from the first height by four inches or more.

13. The bicycle repair stand of claim 12, wherein the main body comprises a pair of vertically offset slots on each side of the opening, each slot being configured to receive a portion of the proximal end of one of the support members.

14. The bicycle repair stand of claim 11, wherein the second bicycle hanger arm is rotated 180° from the first bicycle hanger arm, such that the distal end of the second bicycle hanger is vertically offset from the distal end of the first bicycle hanger.

15. The bicycle repair stand of claim 11, wherein the distal end of the first bicycle hanger arm and the distal end of the second bicycle hanger arm are vertically aligned.

16. The bicycle repair stand of claim 1, further comprising an air pump coupled to the main body.

17. The bicycle repair stand of claim 1, wherein the set of bicycle tools comprises (i) a plurality of hex keys coupled to a single cable, (ii) a plurality of wrenches coupled to a single cable, or (iii) both (i) and (ii).

18. The bicycle repair stand of claim 1, wherein the main body further comprises a third side and a fourth side, and wherein each bicycle hanger arm is attached to the third and fourth sides of the main body.

19. The bicycle repair stand of claim 18, wherein each of the third and fourth sides of the main body comprises a plurality of slots, each of which is configured to receive a portion of the first or second bicycle hanger arm.

20. The bicycle repair stand of claim 1, wherein the second end of each cable is concealed within a portion of the main body.

* * * * *